(12) United States Patent
Suto et al.

(10) Patent No.: US 12,463,213 B2
(45) Date of Patent: Nov. 4, 2025

(54) POSITIVE ELECTRODE ACTIVE MATERIAL FOR LITHIUM-ION SECONDARY CELL, AND LITHIUM-ION SECONDARY CELL

(71) Applicants: JFE STEEL CORPORATION, Tokyo (JP); JFE MINERAL COMPANY, LTD., Tokyo (JP)

(72) Inventors: Mikito Suto, Tokyo (JP); Hiroyuki Masuoka, Tokyo (JP); Akira Matsuzaki, Tokyo (JP); Rintaro Nagano, Tokyo (JP)

(73) Assignees: JFE STEEL CORPORATION, Tokyo (JP); JFE MINERAL COMPANY, LTD., Tokyo (JP)

( * ) Notice: Subject to any disclaimer, the term of this patent is extended or adjusted under 35 U.S.C. 154(b) by 714 days.

(21) Appl. No.: 17/430,253

(22) PCT Filed: Jan. 31, 2020

(86) PCT No.: PCT/JP2020/003683
§ 371 (c)(1),
(2) Date: Aug. 11, 2021

(87) PCT Pub. No.: WO2020/170763
PCT Pub. Date: Aug. 27, 2020

(65) Prior Publication Data
US 2022/0140336 A1    May 5, 2022

(30) Foreign Application Priority Data
Feb. 19, 2019  (JP) ................................ 2019-027419

(51) Int. Cl.
*H01M 4/525* (2010.01)
*H01M 4/36* (2006.01)
(Continued)

(52) U.S. Cl.
CPC ............ *H01M 4/525* (2013.01); *H01M 4/366* (2013.01); *H01M 4/62* (2013.01); *H01M 4/628* (2013.01);
(Continued)

(58) Field of Classification Search
CPC ............................... H01M 4/525; H01M 4/628
See application file for complete search history.

(56) References Cited

U.S. PATENT DOCUMENTS

2004/0110065 A1 * 6/2004 Hamano ............... H01M 4/525
                                                            429/223
2004/0110066 A1   6/2004 Hamano et al.
(Continued)

FOREIGN PATENT DOCUMENTS

CN    101271971 A    9/2008
CN    101953000 A    1/2011
(Continued)

OTHER PUBLICATIONS

Nov. 17, 2023 Office Action issued in Chinese Patent Application No. 202080013985.5.
(Continued)

*Primary Examiner* — Nicholas A Smith
*Assistant Examiner* — Zackary Richard Cochenour
(74) *Attorney, Agent, or Firm* — Oliff PLC

(57) ABSTRACT

A positive electrode active material for a lithium-ion secondary cell having exceptional lithium ion conductivity, the positive electrode active material being such that the absorption of moisture from the atmosphere can be suppressed. This positive electrode active material for a lithium-ion secondary cell has powder particles that include a specific composite oxide, and an organic silicon compound affixed to the surface of the powder particles, the organic functional groups of the organic silicon compound including at least
(Continued)

one selected from the group made of C2-10 alkyl groups and C6-14 aryl groups.

3 Claims, 1 Drawing Sheet

(51) Int. Cl.
    *H01M 4/62*           (2006.01)
    *H01M 10/0525*    (2010.01)
    *H01M 10/0562*    (2010.01)
    *H01M 50/431*     (2021.01)
    *H01M 4/02*          (2006.01)

(52) U.S. Cl.
    CPC ... *H01M 10/0525* (2013.01); *H01M 10/0562* (2013.01); *H01M 50/431* (2021.01); *H01M 2004/021* (2013.01); *H01M 2004/028* (2013.01); *H01M 2300/0068* (2013.01)

(56) References Cited

U.S. PATENT DOCUMENTS

| | | | |
|---|---|---|---|
| 2007/0287070 A1* | 12/2007 | Okumura | H01M 4/131 429/317 |
| 2008/0233477 A1 | 9/2008 | Takahashi et al. | |
| 2011/0027661 A1 | 2/2011 | Okazaki et al. | |
| 2012/0196183 A1 | 8/2012 | Chiga et al. | |
| 2012/0321948 A1* | 12/2012 | Oya | H01M 4/0404 427/126.6 |
| 2013/0236788 A1 | 9/2013 | Tsunozaki et al. | |
| 2015/0118574 A1 | 4/2015 | Visbal et al. | |
| 2015/0340683 A1 | 11/2015 | Hamano et al. | |
| 2015/0349336 A1* | 12/2015 | Yokoyama | H01M 4/505 429/223 |
| 2016/0301063 A1 | 10/2016 | Yukinobu et al. | |
| 2018/0205087 A1* | 7/2018 | Ishikawa | H01M 4/1315 |
| 2018/0277829 A1 | 9/2018 | Konishi et al. | |
| 2019/0198872 A1 | 6/2019 | Saruwatari et al. | |

FOREIGN PATENT DOCUMENTS

| | | |
|---|---|---|
| CN | 102623671 A | 8/2012 |
| CN | 103181006 A | 6/2013 |
| CN | 104821399 A | 8/2015 |
| CN | 105098163 A | 11/2015 |
| CN | 106876697 A | 6/2017 |
| JP | 2000-133272 A | 5/2000 |
| JP | 2002-367610 A | 12/2002 |
| JP | 2004-200160 A | 7/2004 |
| JP | 2004-200161 A | 7/2004 |
| JP | 2009-193940 A | 8/2009 |
| JP | 2013-191539 A | 9/2013 |
| JP | 2014-123529 A | 7/2014 |
| JP | 2015-088383 A | 5/2015 |
| JP | 2016-006762 A | 1/2016 |
| JP | 2016-9524 A | 1/2016 |
| JP | 2018-014199 A | 1/2018 |
| JP | 2018-172255 A | 11/2018 |
| TW | 333709 B | 11/2010 |
| TW | 201719954 A | 6/2017 |
| WO | 2011/105126 A1 | 9/2011 |
| WO | 2018/030199 A1 | 2/2018 |

OTHER PUBLICATIONS

Feb. 21, 2023 Office Action issued in Japanese Patent Application No. 2021-174356.
Aug. 3, 2020 Office Action issued in Taiwanese Patent Application No. 109105033.
May 18, 2021 Office Action issued in Japanese Patent Application No. 2020-526047.
Aug. 3, 2021 Office Action issued in Japanese Patent Application No. 2020-526047.
Apr. 14, 2020 Search Report issued in International Patent Application No. PCT/JP2020/003683.
Mar. 14, 2022 Extended Search Report issued in European Patent Application No. 20759078.7.

\* cited by examiner

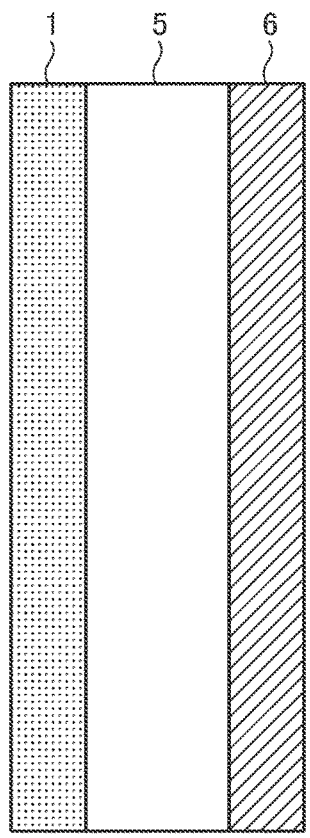

POSITIVE ELECTRODE ACTIVE MATERIAL FOR LITHIUM-ION SECONDARY CELL, AND LITHIUM-ION SECONDARY CELL

TECHNICAL FIELD

The present invention relates to a positive electrode active material for a lithium ion secondary battery and to a lithium ion secondary battery.

BACKGROUND ART

An electrolyte of a lithium ion secondary battery is made of a non-aqueous liquid or solid.

In a lithium ion secondary battery using a solid electrolyte, resistance working on lithium ions that move through an interface between a positive electrode active material and the electrolyte (hereinafter, also referred to as "interface resistance") easily increases. It is said that this phenomenon occurs because the positive electrode active material reacts with the solid electrolyte, thereby forming a high resistance layer on a surface of the positive electrode active material.

Under the foregoing circumstances, Patent Literature 1 discloses a technique for forming a coating layer including lithium niobate or $Li_4Ti_5O_{12}$ on a surface of a positive electrode active material. According to this technique, formation of a high resistance layer at an interface between a positive electrode active material and a solid electrolyte (particularly, sulfide-based solid electrolyte) can be suppressed, thus decreasing interface resistance.

CITATION LIST

Patent Literatures

Patent Literature 1: JP 2009-193940 A

SUMMARY OF INVENTION

Technical Problems

In order to increase a capacity of a lithium ion secondary battery, a positive electrode active material that is abundant in nickel is desired.

Meanwhile, a positive electrode active material that is abundant in nickel (having a large amount of Ni with respect to Ni and X (which is at least one element selected from the group consisting of Co and Mn) easily impairs the battery properties due to adsorption of atmospheric moisture.

For instance, the coating layer described in Patent Literature 1 hardly prevents lithium ions from moving in a positive electrode active material, thus resulting in excellent lithium ion conductivity, but adsorption of atmospheric moisture into a positive electrode active material cannot be suppressed in some cases.

Accordingly, the present invention aims at providing a positive electrode active material for a lithium ion secondary battery excellent in lithium ion conductivity and capable of suppressing adsorption of atmospheric moisture.

Solution to Problems

The present inventors found, through an earnest study, that the above-mentioned objective can be attained according to the constitution described below, and the invention has been completed.

[1] A positive electrode active material for a lithium ion secondary battery comprising:
powdery particles including a composite oxide represented by Formula (1) below; and
an organosilicon compound adhered to surfaces of the powdery particles,
wherein the organosilicon compound includes organic functional groups comprising at least one selected from the group consisting of an alkyl group having 2 to 10 carbon atoms and an aryl group having 6 to 14 carbon atoms, $$Li_aNi_bX_cBa_dY_eO_x \qquad (1)$$

where X is at least one element selected from the group consisting of Co and Mn,
Y is at least one element selected from the group consisting of Na, K, Si, B, P and Al,
a, b, c, d and e are each a real number and satisfy relationships below, and
x is a real number and is not limited to a particular numerical value, $a/(b+c)$: 0.9 to 1.1, $b/(b+c)$: 0.5 to 0.95, $c/(b+c)$: 0.05 to 0.5, $d/(b+c)$: 0.0001 to 0.01, $e/(b+c)$: more than 0 and not more than 0.1, and $b+c=1$.

[2] The positive electrode active material for a lithium ion secondary battery according to [1], wherein the organic functional groups of the organosilicon compound comprise at least one selected from the group consisting of n-propyl group, octyl group and phenyl group.

[3] A lithium ion secondary battery provided with a positive electrode including the positive electrode active material for a lithium ion secondary battery according to [1] or [2].

[4] The lithium ion secondary battery according to [3], wherein the lithium ion secondary battery is an all-solid lithium ion secondary battery provided with a positive electrode capable of charging and discharging lithium, a negative electrode capable of charging and discharging lithium and a solid electrolyte comprising a sulfide.

Advantageous Effects of Invention

The invention can provide a positive electrode active material for a lithium ion secondary battery excellent in lithium ion conductivity and capable of suppressing adsorption of atmospheric moisture.

BRIEF DESCRIPTION OF DRAWINGS

FIG. 1 is a conceptual diagram showing an embodiment example of a cell provided to a lithium ion secondary battery of the invention.

DESCRIPTION OF EMBODIMENTS

In the description, a range expressed using the form of "(numeral) to (another numeral)" should read as a range including both ends defined by the numerals. For example, a range expressed as "A to B" includes "A" and "B".

The invention is described below.

[Positive Electrode Active Material for Lithium Ion Secondary Battery]

The positive electrode active material for a lithium ion secondary battery of the invention includes powdery particles containing a composite oxide represented by Formula (1) to be described later, and an organosilicon compound adhered to surfaces of the powdery particles.

<Powdery Particles>

In the powdery particles, primary particles having an average particle size of not less than 0.1 μm are preferably aggregated to form secondary particles. Since thermal stability is decreased when particles of less than 0.1 μm are contained, powdery particles in which primary particles having an average particle size of not less than 0.1 μm are aggregated to form secondary particles are preferred.

In the positive electrode active material for a lithium ion secondary battery of the invention, secondary particles in which polyhedral primary particles are aggregated into a substantially spherical shape are observed by an electron microscope at a magnification of 3000×.

The powdery particles contain a composite oxide to be described later. A composite oxide content of the powdery particles is preferably not less than 95 mass % and more preferably not less than 98 mass % with respect to the total mass of the powdery particles. The upper limit is not particularly limited and is, for example, 100 mass %.

<Composite Oxide>

The composite oxide is represented by the following Formula (1).

$$Li_aNi_bX_cBa_dY_eO_x \quad (1)$$

X, Y, a, b, c, d, e and x in Formula (1) are defined as described below.

X is at least one element selected from the group consisting of Co and Mn.

Y is at least one element selected from the group consisting of Na, K, Si, B, P and Al.

Each of a, b, c, d and e is a real number, and they satisfy the following relationships.

$a/(b+c)$: 0.9 to 1.1

$b/(b+c)$: 0.5 to 0.95

$c/(b+c)$: 0.05 to 0.5

$d/(b+c)$: 0.0001 to 0.01

$e/(b+c)$: more than 0 and not more than 0.1

$b+c=1$ x is a real number and is not limited to a particular numerical value.

The element symbols are defined as follows: Li (lithium), Ni (nickel), Co (cobalt), Ba (barium), O (oxygen), Mn (manganese), Na (sodium), K (potassium), Si (silicon), B (boron), P (phosphorous) and Al (aluminum).

The foregoing shows a molar number of each element when the total of Ni and X is assumed to be 1 mol (i.e., $b+c=1$).

"$a/(b+c)$," i.e., an amount of Li with respect to Ni and X (hereinafter, also referred to as "Li content") is not less than 0.9, preferably not less than 0.95 and more preferably not less than 0.98. Meanwhile, the Li content is not more than 1.1, preferably not more than 1.08 and more preferably not more than 1.05. The Li content of less than 0.9 results in a crystal structure with many lithium deficiencies and may lead to a decrease in the battery capacity when the composite oxide is used in a positive electrode for a lithium ion secondary battery. In addition, the Li content of more than 1.1 may lead to generation of a hydrate such as lithium hydroxide and/or a carbonate such as lithium carbonate, and the composite oxide may be gelated when an electrode is produced.

"$b/(b+c)$," i.e., an amount of Ni with respect to Ni and X (hereinafter, also referred to as "Ni content") is not less than 0.5, preferably not less than 0.6 and more preferably not less than 0.7. Meanwhile, the Ni content is not more than 0.95, preferably not more than 0.93 and more preferably not more than 0.91. The Ni content of less than 0.5 may lead to a decrease in the battery capacity when the composite oxide is used in a positive electrode for a lithium ion secondary battery. In addition, the Ni content of more than 0.95 leads to inferior stability.

"$c/(b+c)$," i.e., an amount of X with respect to Ni and X (hereinafter, also referred to as "X content") is not less than 0.05, preferably not less than 0.08 and more preferably not less than 0.1. Meanwhile, the X content is not more than 0.5, preferably not more than 0.4 and more preferably not more than 0.35. X improves thermal stability, and the X content of less than 0.05 results in a poor effect of improving thermal stability. The X content of more than 0.5 may lead to a decrease in discharging capacity of a lithium ion secondary battery.

"$d/(b+c)$," i.e., an amount of Ba with respect to Ni and X (hereinafter, also referred to as "Ba content") is not less than 0.0001, preferably not less than 0.001 and more preferably not less than 0.002. Meanwhile, the Ba content is not more than 0.01, preferably not more than 0.008 and more preferably not more than 0.007. Ba improves thermal stability, and the Ba content of less than 0.0001 results in a poor effect of improving thermal stability. The Ba content of more than 0.01 may lead to a decrease in the capacity of a lithium ion secondary battery.

"$e/(b+c)$," i.e., an amount of Y with respect to Ni and X (hereinafter, also referred to as "Y content") is more than 0, preferably not less than 0.001 and more preferably not less than 0.002. Meanwhile, the Y content is not more than 0.1, preferably not more than 0.03 and more preferably not more than 0.01. Y improves thermal stability, and the Y content of more than 0.1 may lead to a decrease in discharging capacity of a lithium ion secondary battery.

A preferred element for Y is Al.

<Organosilicon Compound>

The organosilicon compound contains organic functional groups. The organic functional groups include at least one selected from the group consisting of an alkyl group having 2 to 10 carbon atoms and an aryl group having 6 to 14 carbon atoms.

The alkyl group having 2 to 10 carbon atoms and the aryl group having 6 to 14 carbon atoms may have one or two or more hydrogen atoms substituted with halogen atoms. Here, a preferred halogen atom is fluorine atom.

The number of carbon atoms of the alkyl group is not less than 2 and preferably not less than 3. Meanwhile, the number of carbon atoms of the alkyl group is not more than 10 and preferably not more than 8.

The number of carbon atoms of the aryl group is not less than 6. Meanwhile, the number of carbon atoms of the aryl group is not more than 14, preferably not more than 12 and more preferably not more than 10.

The alkyl group having 2 to 10 carbon atoms may be a chain alkyl group or an alkyl group having a cyclic structure.

In a case of a chain alkyl group, it may take on a straight chain structure or a branched chain structure.

Examples of the alkyl group having 2 to 10 carbon atoms include, but are not limited to, ethyl group, propyl group (n-propyl group), 1-methylethyl group (isopropyl group), butyl group (n-butyl group), 2-methylpropyl group (isobutyl group), 1-methylpropyl group (sec-butyl group), 1,1-dimethylethyl group (tert-butyl group), pentyl group (n-pentyl group), 3-methylbutyl group (isopentyl group), 2,2-dimethylpropyl group (neopentyl group), 1-methylbutyl group (sec-pentyl group), 1-ethylpropyl group (3-pentyl group), 1,1-dimethylpropyl group (tert-pentyl group), hexyl group (n-hexyl group), heptyl group (n-heptyl group), octyl group (n-octyl group), nonyl group (n-nonyl group) and decyl group (n-decyl group).

As the alkyl group having 2 to 10 carbon atoms, an alkyl group having 3 to 8 carbon atoms is preferred, at least one selected from the group consisting of n-propyl group, n-butyl group, n-pentyl group, n-hexyl group, n-heptyl group and n-octyl group is more preferred, and n-propyl group and/or n-octyl group is further preferred.

Examples of the aryl group having 6 to 14 carbon atoms include, but are not limited to, phenyl group, benzyl group (1-phenylmethyl group), 1-phenylethyl group, 2-phenylethyl group, o-methyltolyl group (2-methylphenyl group), m-methyltolyl group (3-methylphenyl group), p-methyltolyl group (4-methylphenyl group), 1-naphthyl group, 2-naphthyl group and triphenylmethyl group (trityl group).

As the aryl group having 6 to 14, an aryl group having 6 to 10 carbon atoms is preferred, phenyl group, benzyl group, 1-naphthyl group and 2-naphthyl group are more preferred, and phenyl group is further preferred.

As the organosilicon compound, a silane containing at least one organic functional group selected from the group consisting of an alkyl group having 2 to 10 carbon atoms and an aryl group having 6 to 14 carbon atoms is preferred.

Specific examples of the silane including an alkyl group having 2 to 10 carbon atoms include, but are not limited to, n-propyltrimethoxysilane, n-propyltriethoxysilane, hexyltrimethoxysilane, hexyltriethoxysilane, octyltriethoxysilane, decyltrimethoxysilane and trifluoropropyltrimethoxysilane.

Specific examples of the silane including an aryl group having 6 to 14 carbon atoms include, but are not limited to, phenyltrimethoxysilane and phenyltriethoxysilane.

As the organosilicon compound, n-propyltriethoxysilane, octyltriethoxysilane and phenyltriethoxysilane are preferred, and n-propyltriethoxysilane is more preferred.

In the positive electrode active material for a lithium ion secondary battery of the invention, the above-described organosilicon compound is adhered to surfaces of the foregoing powdery particles containing the composite oxide. This constitution suppresses formation of a high resistance layer at an interface between a positive electrode active material and a sulfide-based solid electrolyte. Accordingly, lithium ions are not prevented from moving (lithium ion conductivity is excellent). In addition, adsorption of atmospheric moisture into the positive electrode active material is suppressed, thereby improving stability.

The presumable mechanism of this effect is described below. For instance, when organic functional groups of the organosilicon compound include at least one selected from the group consisting of an alkyl group having 2 to 10 carbon atoms and an aryl group having 6 to 14 carbon atoms, steric hindrance is significant, lowering reactivity. As a consequence, presumably, a network structure with organic functional groups is hardly formed, lithium ions are not prevented from moving, and water is not allowed to contact the positive electrode active material.

[Method for Producing Positive Electrode Active Material for Lithium Ion Secondary Battery]

The method for producing the positive electrode active material for a lithium ion secondary battery of the invention is described below but should not be construed as being limited thereto.

For a material used in production of the composite oxide, use can be made of an oxide, or a material that turns into an oxide through firing reaction in the synthesis step of the production process.

The material for use in production of the composite oxide is mixed with a Li-containing component, a Ni-containing component, an X (at least one element selected from the group consisting of Co and Mn)-containing component, a Ba containing component, and a Y (at least one element selected from the group consisting of Na, K, Si, B, P and Al)-containing component, and the mixture is fired. The composite oxide can be produced in this manner.

The method for producing the composite oxide is not particularly limited, and the composite oxide can be produced by various methods including the solid reaction method, a method involving precipitation from a solution and then firing the precipitate, the spray combustion method, and the molten salt method.

Describing an example thereof, first, components including a Li-containing component, a Ni-containing component, an X-containing component and a Ba-containing component are mixed at a ratio in accordance with the composition of the intended lithium-nickel composite oxide to obtain a mixture. While the firing temperature is appropriately selected depending on the type of the composite oxide to be formed, the obtained mixture is fired at temperature of 700° C. to 950° C. in a gaseous atmosphere of one kind or two or more kinds selected from the group consisting of oxygen, nitrogen, argon and helium. The composite oxide can be synthesized in this manner. The foregoing firing is preferably performed as a firing process in which, in an oxygen atmosphere, a preliminary firing step of retaining temperature at 300° C. to 500° C. for 2 to 6 hours, a temperature elevating step of elevating temperature at a rate of 5 to 30° C./minute following the preliminary firing step, and a final firing step of retaining temperature at 700° C. to 950° C. for 2 to 30 hours following the temperature elevating step are performed in sequence.

The Li-containing component, the Ni-containing component, the X-containing component and the Ba-containing component can make use of an oxide, a hydroxide, a nitrate or the like. With regard to Ni and X, since it is important for them to be uniformly mixed, a preferred material therefor, for example, is Ni—X—$(OH)_2$ obtained by the wet synthesis method. Ni—X—$(OH)_2$ is prepared such that a molar ratio of X to a total amount of Ni and X falls within a range of 0.05 to 0.60. For preparation thereof, a dense powdery material of Ni—X—$(OH)_2$ in the form of secondary particles is preferably produced by, for example, the wet synthesis method.

As the Li-containing component, a hydroxide, a nitrate, a carbonate or the like is preferred.

The Y-containing component can make use of, for example, an oxide, a hydroxide, a carbonate, a nitrate, and an organic acid salt of each of the relevant elements.

A preferred production method is a method in which a hydroxide obtained by co-precipitating the Li-containing component, the Ni-containing component and the X-containing component is mixed with a component containing another element (one or two or more selected from the group consisting of oxide, nitrate, sulfate, carbonate, acetate and phosphate), and the obtained mixture is fired, thereby producing the composite oxide.

The composite oxide may also be produced by mixing a hydroxide, which is obtained by co-precipitating the Y-containing component, with a component containing another element (one or two or more selected from the group consisting of oxide, nitrate, sulfate, carbonate, acetate and phosphate) and firing the obtained mixture.

The composite oxide thus obtained takes on a form of powdery particles.

The positive electrode active material for a lithium ion secondary battery of the invention can be produced by, for example, causing the foregoing organosilicon compound to adhere to surfaces of the powdery particles of the obtained composite oxide.

The method for causing the organosilicon compound to adhere to surfaces of the powdery particles of the composite oxide is not particularly limited, and an example thereof is a method in which the powdery particles and the organosilicon compound are mixed and stirred into a uniform mixture. The organosilicon compound that is not adhered to the powdery particles is preferably removed. For instance, a method in which composite oxide particles are mixed with a solution of the organosilicon compound (where a solvent is, for example, alcohol such as ethanol), and subsequently the solvent is vaporized in, for example, a vacuum can be exemplified.

[Lithium Ion Secondary Battery]

The lithium ion secondary battery of the invention is provided with a positive electrode containing the foregoing positive electrode active material for a lithium ion secondary battery. Except the foregoing, a conventionally known constitution can be adopted. For instance, the lithium ion secondary battery of the invention is provided with a positive electrode containing the foregoing positive electrode active material for a lithium ion secondary battery (positive electrode capable of charging and discharging lithium), a negative electrode capable of charging and discharging lithium and an electrolyte, and is sometimes further provided with a separator.

The lithium ion secondary battery of the invention is preferably an all-solid lithium ion secondary battery and is provided with a positive electrode capable of charging and discharging lithium, a negative electrode capable of charging and discharging lithium, and a solid electrolyte comprising a sulfide.

Hereinafter, an example of the lithium ion secondary battery of the invention will be described with reference to FIG. 1.

FIG. 1 is a conceptual diagram showing an embodiment example of a cell provided to the lithium ion secondary battery of the invention. FIG. 1 illustrates an embodiment of a positive electrode layer in a simplified manner.

As shown in FIG. 1, a lithium ion secondary battery 10 (hereinbelow, referred to as "secondary battery 10") is provided with a positive electrode layer 1 containing a positive electrode active material, a solid electrolyte layer 5 containing a sulfide-based solid electrolyte and a negative electrode layer 6 formed of In foil.

During the charging of the secondary battery 10, lithium ions are drawn from the positive electrode active material of the positive electrode layer 1, pass through the solid electrolyte layer 5 and reach the negative electrode 6.

During the discharging of the secondary battery 10, on the other hand, lithium ions released from the negative electrode layer 6 pass through the solid electrolyte layer 5 and reach the positive electrode active material of the positive electrode layer 1.

As above, since lithium ions move across an interface between the positive electrode active material and the solid electrolyte during the charging and discharging of the secondary battery 10, reduction of resistance at the interface (interface resistance) is beneficial in an attempt to increase the capacity and the output of the secondary battery 10.

The positive electrode layer 1 contains, as the positive electrode active material, composite oxide particles to whose surfaces an organosilicon compound is adhered (powdery particles containing the composite oxide). With an organosilicon compound layer being interposed between composite oxide particles and a solid electrolyte, a reaction between the composite oxide particles and the solid electrolyte can be suppressed. As a result, formation of a high resistance layer on surfaces of the composite oxide particles can be suppressed, and the composite oxide particles can be prevented from contacting atmospheric moisture.

That is, the secondary battery 10 is provided with the positive electrode layer 1 capable of reducing the interface resistance and of preventing contact with moisture. The invention can provide the secondary battery 10 that can improve performances by reducing the interface resistance.

EXAMPLES

The present invention is more specifically described below with reference to Examples, to which the present invention is in no way limited.

Example 1

<Preparation of Positive Electrode Active Material>

Composite oxide particles ($Li_{1.03}Ni_{0.9}Co_{0.1}Ba_{0.005}Al_{0.006}O_x$, where x is a real number, available from JFE MINERAL Co., LTD.) were prepared. An organosilicon compound (n-propyltriethoxysilane: KBE-3033, available from Shin-Etsu Chemical Co., Ltd.) was also prepared as a surface-treating agent.

The composite oxide particles were mixed with a surface-treating agent solution prepared by dissolving the surface treating agent in an amount of 1 to 3 mass % with respect to the composite oxide particles in ethanol, and ethanol was vaporized in a vacuum at 70° C., thereby producing the positive electrode active material in which the organosilicon compound is adhered to surfaces of the composite oxide particles.

<Evaluation of Moisture Adsorption Property>

The obtained positive electrode active material was weighed by a specified amount in a sample bottle and stored in a constant temperature and humidity bath being retained in an air atmosphere, at temperature of 25° C.±3° C. and humidity of 60%±5%, and a mass increase ratio after 48 hours was measured. A calculated value based on the average of measurement values of plural samples was treated as a mass increase ratio.

A case where the mass increase ratio was not more than 0.20 mass % was determined as "Satisfactory (A)," whereas a case where the mass increase ratio was more than 0.20 mass % was determined as "Unsatisfactory (B)." The results are shown in Table 1 below.

"Satisfactory" means that adsorption of atmospheric moisture can be suppressed.

<Evaluation of Lithium Ion Conductivity>
1. Preparation of Referential Battery and Measurement of Discharging Capacity The foregoing composite oxide particles (available from JFE MINERAL Co., LTD.) were prepared as a positive electrode active material. To 90 mass % of the positive electrode active material, 5 mass % of acetylene black and 5 mass % of polyvinylidene fluoride, N-methyl-2-pyrolidone was added, and the resultant was sufficiently kneaded, whereby a kneaded material was obtained. The obtained kneaded material was then applied to an aluminum current collector having a thickness of 20 μm and dried, and a laminate was obtained. The obtained laminate was pressurized with a roll-type press such that the laminate had a thickness of 80 μm, and was punched with a diameter of 14 mm. The punched laminate was dried in a vacuum at 150° C. for 15 hours to thereby form a positive electrode. A lithium metal sheet and a polypropylene porous film were used as a negative electrode and a separator, respectively. As an electrolyte, use was made of an electrolytic solution in which one mol of $LiPF_6$ was dissolved in one litter of a mixed solution of ethylene carbonate (EC)/dimethyl carbonate (DMC) mixed at a volume ratio of 1:1. In a glovebox substituted with argon, a referential battery was prepared. At a current density of 1.0 mA/cm², a charging capacity and a discharging capacity were determined in a range of 3.0 to 4.2 V. This cycle was repeated once more, and a charging capacity and a discharging capacity in the second cycle were determined.

2. Preparation of Battery for Evaluation and Measurement of Discharging Capacity As a positive electrode active material, use was made of, in place of the foregoing composite oxide particles (available from JFE MINERAL Co., LTD.), the positive electrode active material in which the organosilicon compound is adhered to surfaces of the composite oxide particles produced as above, and a battery for evaluation was prepared and a discharging capacity in the second cycle was measured in the same manner as that of the referential battery.

3. Evaluation of Lithium Ion Conductivity

With respect to the discharging capacity in the second cycle of the referential battery, when the discharging capacity in the second cycle falls within a range of ±5.00%, the battery for evaluation was evaluated as Satisfactory (A), and when the discharging capacity in the second cycle deviates from the range of ±5.00%, the battery for evaluation was evaluated as Unsatisfactory (B). The results are shown in Table 1 below.

"Satisfactory" means that the lithium ion conductivity is excellent.

<Evaluation of Cycle Characteristic>

As a positive electrode active material, use was made of the positive electrode active material in which the organosilicon compound is adhered to surfaces of the composite oxide particles produced as above, and an all-solid lithium ion secondary battery (all-solid battery) was experimentally produced as described below. In the produced all-solid battery, a sulfide-based solid electrolyte was used.

Specifically, first, 140 mg of the positive electrode active material, 60 mg of a solid electrolyte comprising a sulfide, and 10 mg of acetylene black were mixed in a mortar to thereby obtain a positive electrode composite material. As the solid electrolyte, 75 $Li_2S$-25 $P_2S_5$ (molar ratio) was used.

The solid electrolyte was alone charged into a cylindrical container and pressurized at 2 MPa for 30 seconds. Subsequently, the positive electrode composite body was charged into the cylindrical container and was pressurized at 12 MPa for 60 seconds. In addition, indium foil (100 μm) and lithium foil (200 μm) were charged into the cylindrical container from the opposite side from the positive electrode composite body and were pressurized at 5 MPa for 60 seconds.

The positive electrode composite material, the solid electrolyte, the indium foil, and the lithium foil were held with a stainless jig from the upper and lower sides of the cylindrical container in such a manner that a load of 5 Nm is evenly applied to each of the components. The all-solid battery was thus obtained.

Using the obtained all-solid battery, the cycle test was conducted under the following conditions.

Charging Condition
  Upper limit potential: 3.6 V (with Li—In counter electrode)
  Current value: 0.1 mA
  Cutoff current: 0.05 mA
Discharging Condition
  Lower limit potential: 2.0 V (with LI—In counter electrode)
  Current value: 0.1 mA
Rest Period Between Charging and Discharging
  10 minutes
Number of Cycles 25

A ratio of the discharging capacity in the 25th cycle to the discharging capacity in the first cycle (25th cycle/first cycle) was regarded as a capacity maintenance ratio (unit: %). The all-solid battery was evaluated as Satisfactory (A) when the capacity maintenance ratio is not lower than 70% and was evaluated as Unsatisfactory (B) when the capacity maintenance ratio was lower than 70%. The results are shown in Table 1 below.

"Satisfactory" means that the cycle characteristic of the all-solid battery using a sulfide-based solid electrolyte is excellent.

Example 2

As the surface treating agent, octyltriethoxysilane (KBE-3083, available from Shin-Etsu Chemical Co., Ltd.) was used. Except the above difference, moisture adsorption property, lithium ion conductivity and cycle characteristic were evaluated as with Example 1. The results are shown in Table 1 below.

Example 3

As the surface treating agent, phenyltriethoxysilane (KBE-103, available from Shin-Etsu Chemical Co., Ltd.) was used. Except the above difference, moisture adsorption property, lithium ion conductivity and cycle characteristic were evaluated as with Example 1. The results are shown in Table 1 below.

Comparative Example 1

As the surface treating agent, a silane coupling agent (N-2-(aminoethyl)-3-aminopropyltrimethoxysilane: KBE-603, available from Shin-Etsu Chemical Co., Ltd.) was used. Except the above difference, moisture adsorption property, lithium ion conductivity and cycle characteristic were evaluated as with Example 1. The results are shown in Table 1 below.

Comparative Example 2

As the surface treating agent, a silane coupling agent (3-methacryloxypropyltriethoxysilane: KBE-503, available from Shin-Etsu Chemical Co., Ltd.) was used. Except the above difference, moisture adsorption property, lithium ion conductivity and cycle characteristic were evaluated as with Example 1. The results are shown in Table 1 below.

Comparative Example 3

As the surface treating agent, lithium titanate ($Li_4Ti_5O_{12}$) synthesized from lithium ethoxide (available from Ardrich), titanium tetraisopropoxide (available from Wako Pure Chemical Industries, Ltd.) and acetylacetone (available from Wako Pure Chemical Industries, Ltd.) was used. Except the above difference, moisture adsorption property, lithium ion conductivity and cycle characteristic were evaluated as with Example 1. The results are shown in Table 1 below.

TABLE 1

Table 1

|  |  | Examples | | | Comparative Examples | | |
| --- | --- | --- | --- | --- | --- | --- | --- |
|  |  | 1 | 2 | 3 | 1 | 2 | 3 |
| Composite oxide particles |  | Product of JFE MINERAL Co., LTD. | Product of JFE MINERAL Co., LTD. | Product of JFE MINERAL Co., LTD. | Product of JFE MINERAL Co., LTD. | Product of JFE MINERAL Co., LTD. | Product of JFE MINERAL Co., LTD. |
| Surface treating agent |  | KBE-3033 | KBE-3083 | KBE-103 | KBE-603 | KBE-503 | $Li_4Ti_5O_{12}$ |
| Moisture adsorption property | Mass increase ratio | 0.06% | 0.06% | 0.05% | 0.25% | 0.09% | 0.25% |
|  | Satisfactory/ unsatisfactory | A | A | A | B | A | B |
| Lithium ion conductivity | Capacity change ratio | −0.50% | −1.20% | 0.90% | −5.20% | −13.30% | −3.00% |
|  | Satisfactory/ unsatisfactory | A | A | A | B | B | A |
| Cycle characteristic | Capacity maintenance ratio | 80% | 80% | 80% | 60% | 60% | 70% |
|  | Satisfactory/ unsatisfactory | A | A | A | B | B | A |

[Discussion of Result]

As to the positive electrode active materials of Examples 1 to 3, adsorption of atmospheric moisture could be suppressed, and the lithium ion conductivity was excellent. In addition, the all-solid battery using a sulfide-based solid electrolyte exhibited good cycle characteristic.

As to the positive electrode active materials of Comparative Examples 1 to 3, on the other hand, moisture adsorption property and/or lithium ion conductivity was inferior. The cycle characteristic was also insufficient in some cases. Below described are details.

The positive electrode active material of Comparative Example 1 failed to suppress adsorption of atmospheric moisture and also exhibited inferior lithium ion conductivity. The cycle characteristic was also insufficient.

The positive electrode active material of Comparative Example 2 could suppress adsorption of atmospheric moisture but exhibited inferior lithium ion conductivity. The cycle characteristic was also insufficient.

The positive electrode active material of Comparative Example 3 exhibited relatively good lithium ion conductivity and cycle characteristic but failed to suppress adsorption of atmospheric moisture. Note that Comparative Example 3 adopted the technique described in Patent Literature 1 (JP 2009-193940 A).

REFERENCE SIGNS LIST 1 positive electrode layer
5 solid electrolyte layer
6 negative electrode layer
10 lithium ion secondary battery (secondary battery)

The invention claimed is:

1. A positive electrode active material for a lithium ion secondary battery comprising:
powdery particles including a composite oxide represented by Formula (1) below; and
an organosilicon compound adhered to surfaces of the powdery particles,
wherein the organosilicon compound is at least one selected from the group consisting of n-propyltriethoxysilane, octyltriethoxysilane, and phenyltriethoxysilane, $$Li_aNi_bX_cBa_dY_eO_x \qquad (1)$$

where X is at least one element selected from the group consisting of Co and Mn,
Y is at least one element selected from the group consisting of Na, K, Si, B, P and Al,
a, b, c, d and e are each a real number and satisfy relationships below, and
x is a real number and is not limited to a particular numerical value, $a/(b+c)$: 0.9 to 1.1, $b/(b+c)$: 0.5 to 0.95, $c/(b+c)$: 0.05 to 0.5, $d/(b+c)$: 0.0001 to 0.01, $e/(b+c)$: more than 0 and not more than 0.1, and $b+c=1$.

2. A lithium ion secondary battery provided with a positive electrode including the positive electrode active material for a lithium ion secondary battery according to claim 1.

3. The lithium ion secondary battery according to claim 2, wherein the lithium ion secondary battery is an all-solid lithium ion secondary battery provided with a positive electrode capable of charging and discharging lithium, a negative electrode capable of charging and discharging lithium and a solid electrolyte comprising a sulfide.

* * * * *